United States Patent
Chloupek

(10) Patent No.: US 6,707,282 B2
(45) Date of Patent: Mar. 16, 2004

(54) SWITCHED CONTROL OF INDUCTOR RINGING FOR A BOOST SWITCHED POWER SUPPLY

(75) Inventor: James E. Chloupek, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 10/165,007

(22) Filed: Jun. 7, 2002

(65) Prior Publication Data

US 2003/0001553 A1 Jan. 2, 2003

Related U.S. Application Data

(60) Provisional application No. 60/302,036, filed on Jun. 29, 2001.

(51) Int. Cl.⁷ .............................. G05F 1/618; H02J 9/01
(52) U.S. Cl. ........................................ 323/272; 307/66
(58) Field of Search ................................. 323/312, 313, 323/314, 315, 316, 207, 222, 272; 307/66, 296.1, 296.3, 48, 73

(56) References Cited

U.S. PATENT DOCUMENTS 5,021,679 A * 6/1991 Fairbanks et al. ............ 307/66

* cited by examiner

Primary Examiner—Rajnikant B. Patel
(74) Attorney, Agent, or Firm—W. Daniel Swayze, Jr.; W. James Brady; Frederick J. Telecky, Jr.

(57) ABSTRACT

A power supply circuit for generating regulated voltages includes a storage circuit to store the voltages, a control circuit to control the level of stored voltage, and a pump circuit to shift the input voltage to a higher voltage.

A shunt circuit to shunt inductor ringing.

3 Claims, 3 Drawing Sheets

SWITCHED CONTROL OF INDUCTOR RINGING FOR A BOOST SWITCHED POWER SUPPLY

This application claims the benefit of application No. 06/302,036 filed Jun. 29, 2001.

FIELD OF THE INVENTION

The present invention relates to switching power supplies which use an inductor, and more particularly to a merged boost and polarity inverting switching power supplies in hard disk drives.

BACKGROUND OF THE INVENTION

The positive boost switching power supplies typically includes an inductor which has the supply end connected to a power source, with the output end of the inductor connected to a driver and the anode end of a diode (or series of diodes). The cathode end of the diode is connected to the positive output storage capacitor. In the storage portion of the cycle, the driver pulls the output end of the inductor to near ground to store energy in its magnetic field. In the boost portion of the cycle, the driver turns off, the inductor voltage flies high, and the inductor's stored energy is transferred through the diode to the positive output storage capacitor. When the driver senses the desired output voltage has been reached on the positive output storage capacitor, the driver may reduce the storage portion of the cycle or may skip the storage portion of the cycle until the output voltage drops below the desired regulated voltage.

When a polarity inverting negative switching power supply is typically merged with the positive boost switching power supply as described above, a transfer capacitor is also connected to the output end of the inductor. The other end of the transfer capacitor is connected to the anode end of a diode to ground and the cathode end of the diode whose anode is connected to the negative output storage capacitor. In the storage portion of the cycle, the driver pulls low to transfer charge from the transfer capacitor through the diode to the negative output storage capacitor. In the boost portion of the cycle, the driver turns off, the inductor voltage flies high, and the inductor charges the transfer capacitor through the diode to ground.

The positive output voltage can be regulated to any voltage more positive than the input supply voltage. Since only one output can be regulated in a merged boost switching power supply, the negative output voltage will not be well regulated and is somewhat dependent the output loads and on the number of diodes used in series with the capacitors. This application of the positive and negative boost switching power supply regulates to 25 volts Vpp (positive voltage) output, and approximately 24 v Vnn (negative voltage) output when one diode is used between the inductor and the positive storage capacitor. This application used a 2 MHz constant clock frequency. This driver application uses a NFET to pull the inductor output down to ground, is current limited to approximately 100 mA, and the driver is turned off when the current limit is reached (to reduce NFET power dissipation and increase efficiency). In this application, when Vpp exceeds it's regulated voltage, the driver skips the storage portion of the cycle to avoid overcharging, until the output voltage drops below the regulated voltage.

One problem with a switched power supply is when most of the inductor's stored energy has been transferred to the Vpp positive output capacitor; the inductor's voltage will fall lower than the positive output capacitor voltage plus a diode. At this point, the inductor load changes to a high impedance and the inductor rings from a positive peak voltage near the positive output capacitor voltage and a negative peak voltage near ground at a frequency much higher than the clock frequency. This high frequency may be coupled to other circuits to effect their operation.

SUMMARY OF THE INVENTION

The present invention includes a shunt circuit between the inductor output and the input supply, and as a consequence, the inductor voltage is shunted at times in the cycle, quickly reducing the ringing of the inductor voltage.

DETAILED DESCRIPTION OF THE DRAWINGS

Figure 1A:
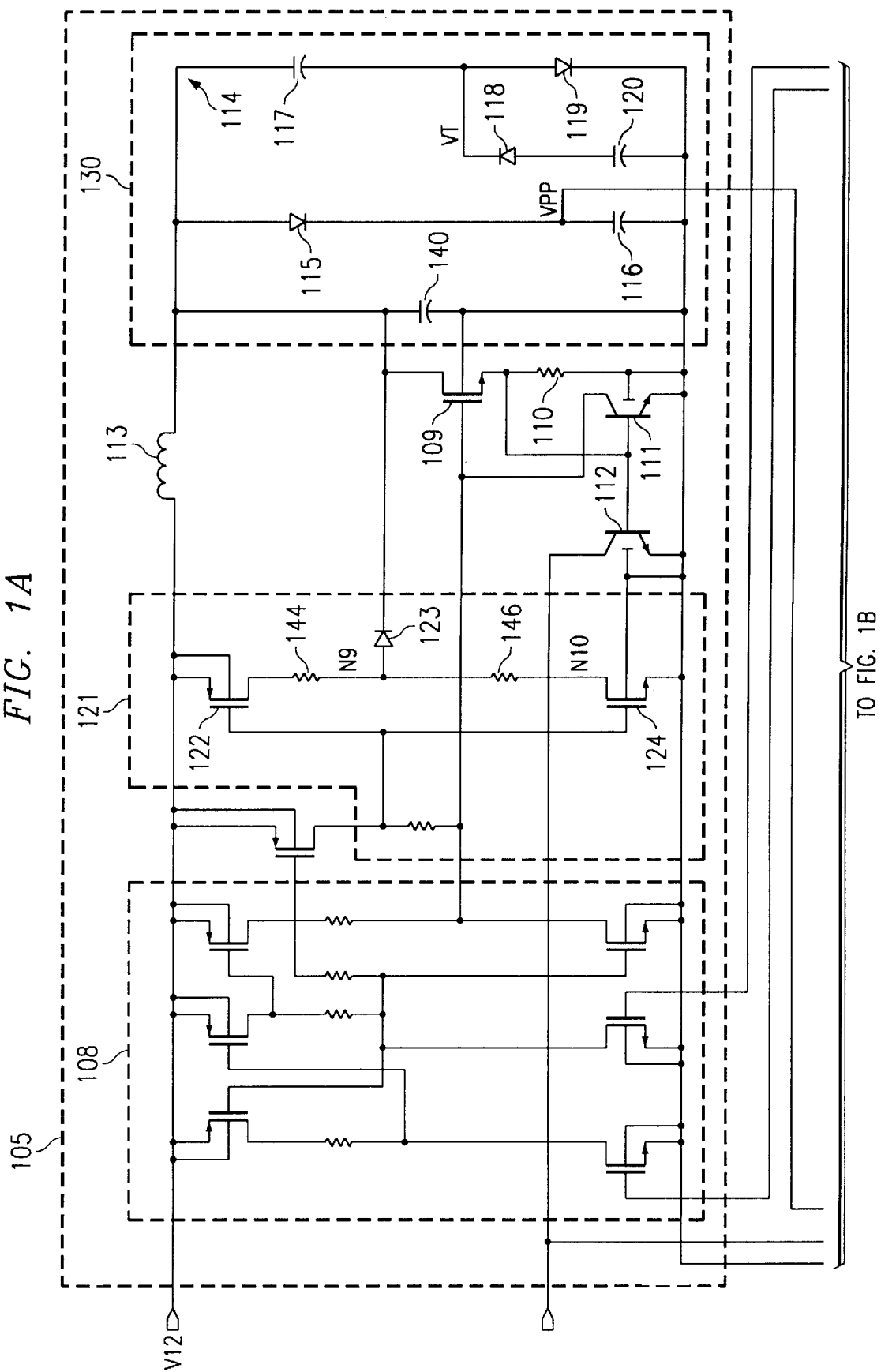
FIG. 1 illustrates a circuit of the present invention.
Figure 1B:
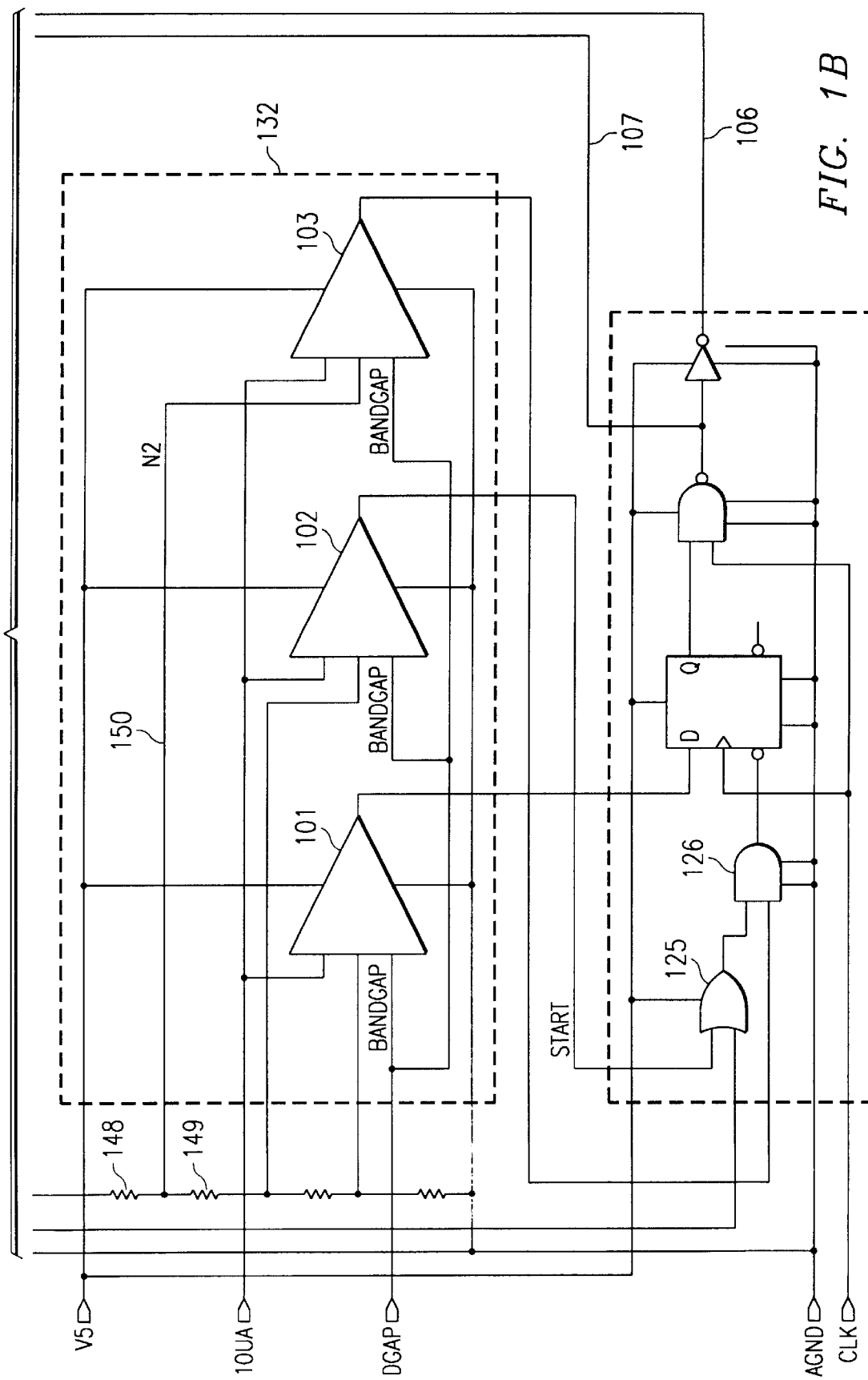
Figure 2:
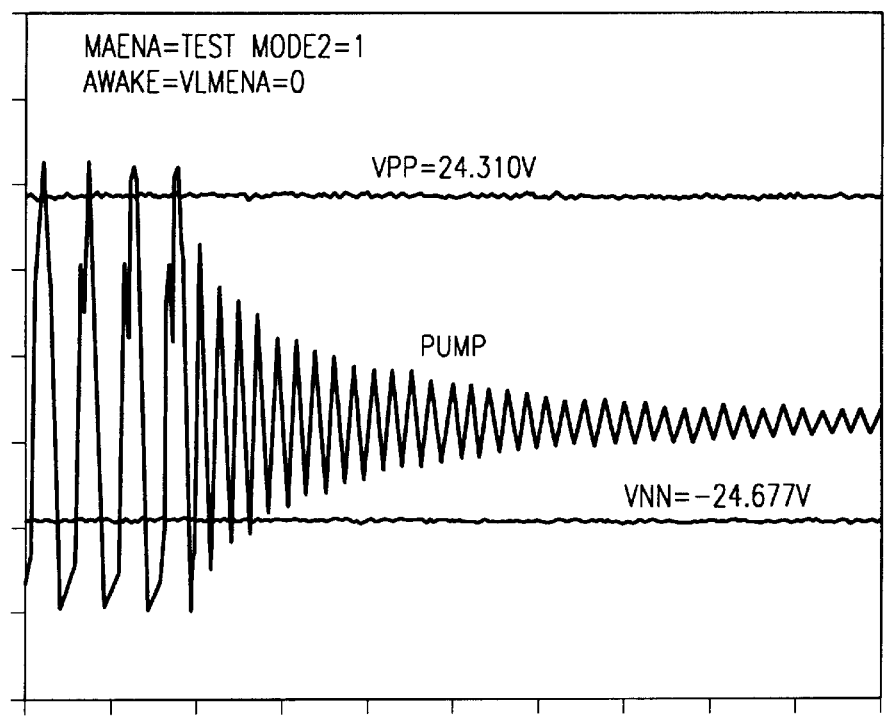
FIG. 2 illustrates a output waveform which is not shunted.
Figure 3:
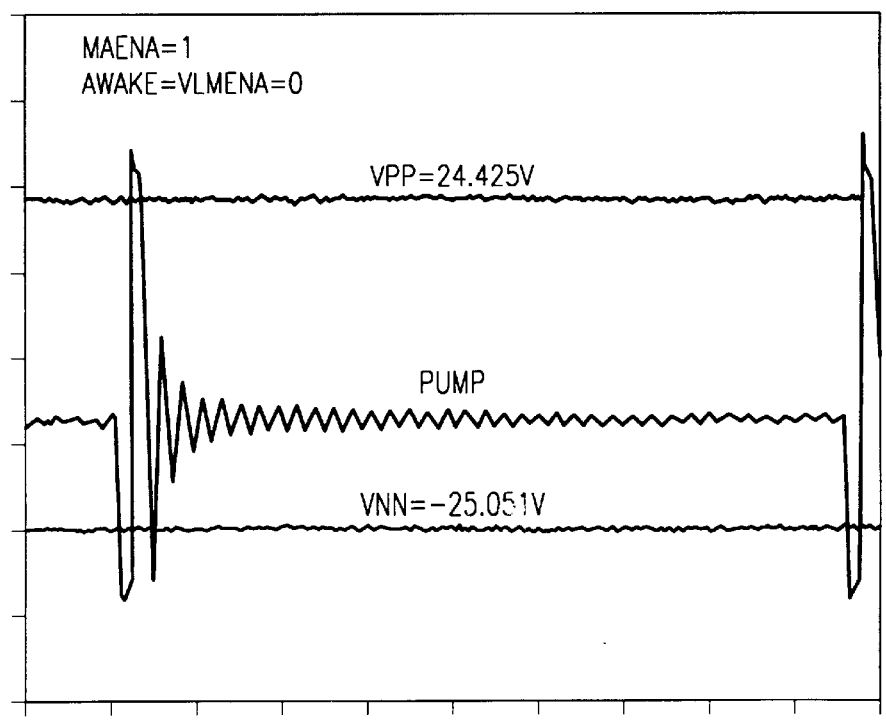
FIG. 3 illustrates a output waveform of the present invention.

Turning now to FIG. 1, FIG. 1 illustrates a comparator circuit 132 outputs connected to a logic section 134 inputs. The logic section 134 outputs 106 and 107 are connected to a level shifting circuit 108 inputs. The level shifting circuit 108 outputs are connected to a shunt circuit 121 and a pump circuit 130 inputs. The shunt circuit 121 and pump circuit 130 common output node 114 is connected to a storage circuit 131 input. The storage circuit 131 output Vpp is connected to a comparator circuit 132 input.

The comparator circuit 132 includes a resistor 146, a resistor 147, a resistor 148, a resistor 149, a comparator 101, a comparator 102, and a comparator 103. The logic section 134 includes an OR gate 125, an AND gate 126, a D-FLIP-FLOP 127, a NAND gate 128, and an INVERTER 129. The level shifting circuit 108 includes 3 NFETs, 4 PFETs, and 4 resistors. The pump circuit 130 includes a NFET 109, a resistor 110, a NPN 111, and a NPN 112. The shunt circuit 121 includes a PFET 124, a PFET 122, a resistor 143, a resistor 144, a resistor 145, a diode 123, and a NFET 124. The storage circuit 131 includes an inductor 113, a diode 115, a capacitor 116, a capacitor 117, a diode 118, a diode 119, and a capacitor 120.

The present invention operates as follows: The current through an inductor 113 resists change; so at the start of the storage portion of the cycle, the inductor 113 current will be low and will increase as over the storage portion of the cycle. When the Vpp and Vnn voltages are near their regulated value, the transfer capacitor 117 and Vnn negative output storage capacitor 120 will be nearly fully charged and will present a lower current load at the start of the storage portion of the cycle. The current in the inductor and therefore in the NFET 109 will increase in the charge portion of the cycle until the current limit is reached, or the charge portion of the cycle is ended by the clock.

When the NFET 109 is turned off for the transfer portion of the cycle, the inductor 113 current resists change and will cause the node 114 voltage to fly high until a load draws that amount of current out of the inductor, and the inductor current will then ramp down as the current charges the capacitors.

In the comparator circuit 132, the resistor string is made up of resistor 146, resistor 147, resistor 148, and resistor 149 and divides the Vpp voltage for use by the comparators to compare to a voltage from a bandgap voltage reference (not shown). Comparator 101 regulates the Vpp voltage to 25 v. Comparator 102 senses if Vpp is above approximately 75% of Vpp regulation voltage. Comparator 103 inhibits the storage cycle if Vpp is below approximately 50% of the input supply.

The logic section 134 puts the regulator in the storage portion of the cycle with the output 106 high and the output 107 low, and puts the regulator in the boost portion of the cycle with the output 106 low and the output 107 high. The line 105 pulled low when NFET 109 reaches it's current limit and the comparator 102 sensing Vpp is above approximately 75% of the Vpp regulation voltage into the OR gate 125, or the comparator 103 sensing the Vpp is below approximately 50% of the input supply into the AND gate 126, will clear the D-FLIP-FLOP 127 and the regulator will stay in or go to the boost portion of the cycle. The clock going high sets the D-FLIP-FLOP 127 to start the storage portion of the cycle if the comparator 103 senses Vpp is above approximately 50% of the input supply and the comparator 101 senses Vpp is below the Vpp regulation voltage. The storage portion of the cycle ends and the boost portion of the cycle begins at the first of the clock going low or the clearing of the D-FLIP-FLOP 127 by AND gate 126.

The level shifting circuit 108 is used to convert the 5 v signals from the logic section 134 to 12 v signals needed by the shunt circuit 121 and the pump circuit 130, for example and other voltages could be used.

The pump circuit 130 sinks current from the inductor 113 and the transfer capacitor 117. A current source to 5 v (not shown) is connected as a pull-up to the collector 105 of NPN 112. The collector of NPN 111 is connected to the gate of NFET 109. The bases of NPN 111 and NPN 112 are connected to the source of NFET 109 and the resistor 110. When the NFET 109 is conducting in the storage portion of the cycle and the current through the resistor 110 causes a voltage of approximately 0.72 v on the bases of NPN 111 and NPN 112, NPN 111 and NPN 112 to turn on indicating the current limit has been reached, NPN 112 pulls the gate of NFET 109 to a lower voltage to limit the NFET 109 current, and NPN's 111 collector pulls 105 low. If comparator 102 senses Vpp is above approximately 75% of Vpp regulation voltage, the logic section 134 will cause NFET 109 to turn off starting the boost portion of the cycle.

When NFET 109 switches off to start the boost portion of the cycle, the inductor current will try to continue, and node 114 voltage flies high fast. The level shifting circuit 108 turns on PFET 122 in the shunt circuit 121. Diode 123 prevents any shunt current while node 114 voltage is above the input supply voltage. When most of the inductor stored energy has been transferred to the Vpp positive output capacitor 116 and the transition capacitor 117, and the boost portion of the cycle has not ended, the node 114 voltage will fall.

When node 114 voltage falls lower than approximately 1 v below the input supply, PFET 122 shunts the inductor current to the input supply through the resistor 144 and diode 123. In the storage portion of the cycle, PFET 122 is turned off and NFET 124 is turned on to pull the anode of diode 123 low so there is no current drawn.

The resistor 141, the resistor 142, the resistor 143, and the gate capacitance of the PFET 124, the PFET 122, and the NFET 109 are used to form delays so the PFET 122 and the NFET 109 drive times do not overlap.

When NFET 109 is conducting for the storage portion of the cycle, current is drawn from the input supply through the inductor 113 to build up the inductor's storage field, and through the series of transfer capacitor 117, Vnn diode 118, and Vnn negative output storage capacitor 120 to build up the negative charge on Vnn negative output storage capacitor 120. When NFET 109 is turned off for the boost portion of the cycle, the inductor 113 output node 114 voltage flies high, and the inductor's storage field drives current through the diode 115 to build up the charge on the Vpp positive output storage capacitor 116, and through the series of the transfer capacitor 117 and the diode 119 to build up the voltage on the transfer capacitor 117. The highest voltage on node 114 will be the Vpp regulation voltage on the Vpp positive output storage capacitor 116 plus the voltage drop of diode 115, and also the voltage on the transfer capacitor 117 plus the voltage drop of diode 119. The highest voltage that can be transferred to the Vnn negative output storage capacitor 120 is the transfer capacitor 117 voltage minus the drop of diode 118. In the circuit shown, the magnitude of Vnn negative voltage will be approximately 1 diode drop less than and not more than the positive voltage of Vpp. Vnn is unregulated and will change with the loading on Vpp and Vnn. Diodes can be added in series with the shown diodes to affect the relationship between Vpp and Vnn.

When the regulator output loads are light and at times may be no load, a small inductor may be used. The energy storage of a smaller inductor is less, the inductor energy may be depleted before the end of many of the cycles, and so the ringing may occur in many of the cycles.

What is claimed is:

1. A power supply circuit for generating regulated voltages, comprising:

a pump circuit to boost said voltages by employing a charge cycle;

a storage circuit to store said voltages including a positive voltage storage capacitor and a negative voltage storage capacitor;

a control circuit to regulate said storage of voltage;

a shunt circuit including an indicator to shunt inductance ringing; and wherein when said inductor stops dumping energy to said capacitors, said shunt circuit being turned on to shunt said inductance ringing;

wherein said shunt circuit includes a diode to activate said shunt circuit.

2. A power supply circuit for generating regulated voltages as in claim 1, wherein said shunt circuit includes a pair of field effect transistors (FET).

3. A power supply circuit for generating regulated voltages as in claim 2, wherein said pair of field effect transistors are of the opposite type.

* * * * *